A. JENSEN.
SEAT COVER.
APPLICATION FILED MAR. 22, 1916.
1,209,586. Patented Dec. 19, 1916.
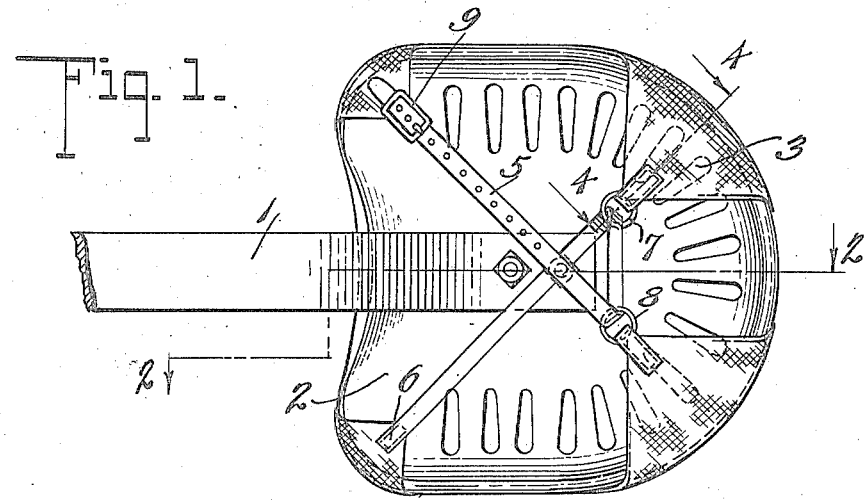
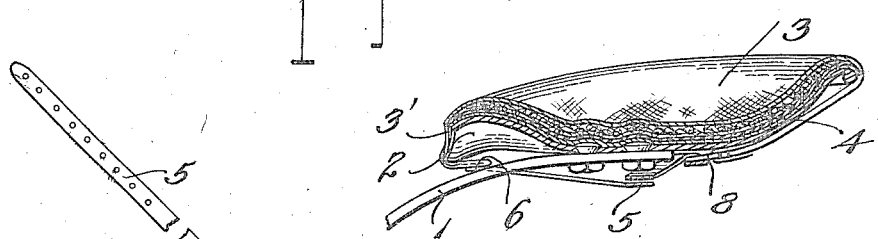
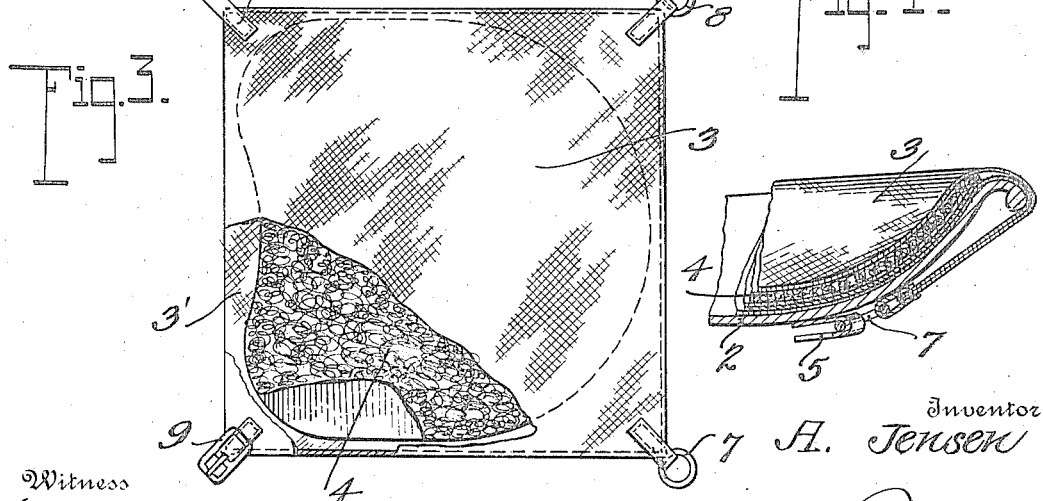
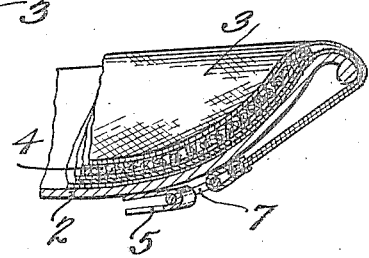
Inventor
A. Jensen
By Robert Robb
Attorneys
Witness
C. H. Wagner

UNITED STATES PATENT OFFICE.

ANDREW JENSEN, OF ROUND LAKE, MINNESOTA.

SEAT-COVER.

1,209,586.  Specification of Letters Patent. Patented Dec. 19, 1916.

Application filed March 22, 1916. Serial No. 85,856.

*To all whom it may concern:*

Be it known that I, ANDREW JENSEN, a citizen of the United States, residing at Round Lake, in the county of Nobles and State of Minnesota, have invented certain new and useful Improvements in Seat-Covers, of which the following is a specification.

The present invention consists of an improved form of cover adapted particularly to be used in connection with the seats of various kinds of agricultural implements.

Among the objects of the invention are the provision of a simple form of cover preferably made of canvas or similar fabric material adapted to be very quickly placed over the seat of an implement to cover the latter, and to be as readily removed; to provide special means for securing the cover in place on the seat to facilitate attachment and removal; to so construct the cover that it has an open end, said open end facilitating the placing within the cover and removal therefrom of a protective mat of wool, rubber or the like, dependent upon whether the invention is to be used in cold or warm weather, said mat being prevented from unauthorized displacement from the seat and from within the cover by reason of the peculiar securing means employed for the latter which coöperates to partially close the open end of the cover when the latter is once adjusted to the seat.

The covering means of the invention is further designed with a view to exceeding simplicity so that it may be very cheaply made but thoroughly serviceable, and with a further view to enabling the same to be rolled up into a compact roll so that it may be carried readily from one place to another or packed away as desired, all of which objects and other advantages will be apparent upon consulting the following detail description in connection with the annexed drawings, in which—

Figure 1 is a bottom plan view showing the ordinary seat used on an agricultural implement having the cover of the invention applied thereto; Fig. 2 is a sectional view on the line 2—2 of Fig. 1; Fig. 3 is a bottom plan view of the cover spread out flat and with its under side partly broken away to show the interior mat or cushion; and Fig. 4 is a fragmentary sectional view on the line 4—4 of Fig. 1 and illustrating more fully the slip connection intermediate the securing strap and certain loops attached to corners of the cover.

In the drawings, 1 denotes the supporting standard for the seat 2 of an agricultural implement such as a mowing machine, rake, or the like. The seat 2 is an ordinary metal seat so commonly in use and by reason of its formation of metal the seat is very cold to sit upon in cool weather at the commencement of use of the implement, and in warm weather becomes intensely heated, with resultant discomfort to the operator of the implement, as well known. It is with the purpose of eliminating such discomfort that the cover of this invention has been designed, said cover consisting of a bag-like body 3 preferably made of canvas, duck, khaki or other strong fabric material, said body being open at its front end 3' so that the protective mat or cushion 4 may be readily introduced between the layers of material forming the body and withdrawn as required. It is contemplated that for cold weather use the mat 4 shall preferably be of wool or sheepskin, or any warm material. For summer or hot weather use the mat will preferably be of rubber so as to keep the seat 2 as cool as practicable when in use, or if desired both the rubber and the wool or like cushion may be superposed within the bag-like body 3 and their positions interchanged according to which one may be desired to be used more proximate to the body of the person sitting on the seat 2.

The securing means for the cover as seen in Figs. 1 and 3 particularly is exceedingly simple but effective for the purposes of the invention. Said means comprises a single strap 5 one end of which is attached to a front corner portion of the body 3 at 6, is passed through a loop 7 connected with the diagonally opposite corner portion of the part 3, thence passed through a loop 8 on the other rear corner portion of the cover, from which it extends to a buckle 9 diagonally opposite the last mentioned corner portion of the cover. By reason of the adjustable connection between the strap 5 and the buckle 9 it will be apparent that the cover may be readily placed over seats of different sizes, that owing to the arrangement and manner of attachment of the strap with respect to the corner portions of the cover the latter may be readily drawn to a greater or less extent to lap beneath the seat 2, and that the connection of the cover with the seat may be effected by the single operation properly adjusting the strap in connection with the buckle 9.

It will be furthermore noted that by reason of the arrangement of the strap 5 and its action to pull the front corners of the cover body 3 beneath the seat 2 the opening at the front portion 3' of the body 3 is adapted to be partially closed whereby to prevent liability of displacement of the mat or cushion 4 within the body 3. Said mat or cushion 4 is preferably of rounded form at its corner portions so as not to extend all the way to the corners of the body 3, thus readily permitting the material of the latter to fold beneath the cover incident to the tightening of the securing means 5 in the manner stated.

The form of the seat cover of this invention is especially advantageous in that it may be applied to almost any size and shape of implement seat commonly employed at the present time and the ease with which it may be removed and attached is the same irrespective of the kind of seat with which it is used. When once removed, since practically every portion of the main parts of the cover and its attaching means are flexible, the cover may be rolled and placed in the pocket, or packed in any small place. In order that the cover 3 may not absorb light rays especially in hot weather, the material from which it is made will be preferably white in color.

Having thus described the invention, what is claimed as new is:—

1. A cover for seats of agricultural implements, the same comprising a body of suitable fabric material, and attaching means for securing said body over a seat consisting of fastening members secured to the corners of the material, and a strap fastened to one forward corner, said strap passing across beneath the seat and through the fastening member in the diagonally opposite rear corner, thence through the fastening member in the other rear corner and finally back diagonally across the seat, crossing itself at approximately right angles to the fastening member on the remaining forward corner.

2. A cover for the seats of agricultural implements, the same comprising a bag-like body open at one end, a mat received within the body through said open end, and attaching means for said body connected with the corner portions thereof and adjustable to pull the corner portions of the body at the open end so as to lap beneath a seat over which the cover is disposed, whereby to partially close the open end of the body and prevent displacement of the mat therein.

3. As a new article of manufacture, a cover for seats of agricultural implements, the same comprising a bag-like body open at one end and made of fabric material, a protective mat disposed within said body, and attaching means for connecting said body to a seat over which it may be disposed including a strap permanently connected at one end with one of the open corner portions of the body, loops connected with the rear corner portions of the body and through which said strap passes loosely, and a buckle connected with the other corner portion at the open end of the body for adjustable connection with the free end of the strap, said attaching means being operable to pull the corner portions of the body beneath a seat to which the cover may be attached so that the opening of the body is partially closed by certain of said corner portions and unauthorized displacement of the mat prevented.

In testimony whereof I affix my signature.

ANDREW JENSEN.